(12) United States Patent
Froh et al.

(10) Patent No.: US 10,058,904 B2
(45) Date of Patent: Aug. 28, 2018

(54) WASTE DISPOSAL CLOSURE SYSTEM

(71) Applicants: Commercial Liability Partners, LLC, St. Louis, MO (US); Key Environmental, Inc., Carnegie, PA (US)

(72) Inventors: Ron Froh, Wildwood, MO (US); Alan E. Briggs, Wexford, PA (US); James Clayton, Leesburg, VA (US)

(73) Assignees: Commercial Liability Partners, LLC, St. Louis, MO (US); Key Environmental, Inc., Carnegie, PA (US)

( * ) Notice: Subject to any disclaimer, the term of this patent is extended or adjusted under 35 U.S.C. 154(b) by 0 days.

(21) Appl. No.: 15/452,004

(22) Filed: Mar. 7, 2017

(65) Prior Publication Data

US 2017/0259310 A1    Sep. 14, 2017

Related U.S. Application Data

(60) Provisional application No. 62/305,300, filed on Mar. 8, 2016, provisional application No. 62/457,577, filed on Feb. 10, 2017.

(51) Int. Cl.
  *B09B 1/00* (2006.01)
  *E02D 3/00* (2006.01)

(52) U.S. Cl.
  CPC .............. *B09B 1/004* (2013.01); *E02D 3/00* (2013.01); *B09B 2220/06* (2013.01)

(58) Field of Classification Search
  CPC .................. B09B 1/00; B09B 1/004
  See application file for complete search history.

(56) References Cited

U.S. PATENT DOCUMENTS

| | | | |
|---|---|---|---|
| 1,935,090 A | 11/1933 | Holland | |
| 3,579,443 A | 5/1971 | Russell | |
| 3,586,624 A | 6/1971 | Gordon | |
| 3,614,867 A | 10/1971 | Nieman | |
| 3,705,851 A * | 12/1972 | Brauer | B09B 1/00 210/170.01 |
| 3,731,492 A * | 5/1973 | Ageev | E02L 37/06 405/117 |
| 3,732,697 A | 5/1973 | Dickson | |
| RE29,783 E | 9/1978 | Smith | |
| 4,177,386 A | 12/1979 | Wachter | |
| 4,194,855 A | 3/1980 | Egger | |
| 4,428,700 A | 1/1984 | Lennemann | |
| 4,543,013 A | 9/1985 | Wagner | |
| 4,588,088 A | 5/1986 | Allen | |

(Continued)

FOREIGN PATENT DOCUMENTS

| | | |
|---|---|---|
| CN | 204080588 | 1/2015 |
| CN | 204132024 | 2/2015 |

OTHER PUBLICATIONS

Briggs, Alan: Civil Engineering AS-Built Drawings SCCC and Diamond Sites Kearny, New Jersey 2011.*

(Continued)

*Primary Examiner* — John J Kreck
(74) *Attorney, Agent, or Firm* — Dennis A. Bennett

(57) ABSTRACT

An impoundment closure system that employs a low permeability membrane on top of a waste materials with ponded water on top of the low permeability membrane.

22 Claims, 5 Drawing Sheets

(56) References Cited

U.S. PATENT DOCUMENTS

| | | | |
|---|---|---|---|
| 4,624,604 A | | 11/1986 | Wagner |
| 4,632,602 A | | 12/1986 | Hovnanian |
| 4,645,382 A | | 2/1987 | Burkhardt |
| 4,842,774 A | | 6/1989 | Golden |
| 4,869,621 A | | 9/1989 | McLaren |
| 4,911,757 A | | 3/1990 | Lynn |
| 4,946,719 A | | 8/1990 | Dempsey |
| 4,981,394 A | | 1/1991 | McLaren |
| 5,026,208 A | | 6/1991 | Beyer |
| 5,040,920 A | | 8/1991 | Forrester |
| 5,054,406 A | | 10/1991 | Judd |
| 5,141,362 A | | 8/1992 | Kugler |
| 5,181,803 A | | 1/1993 | Smith |
| 5,205,068 A | | 4/1993 | Solomou |
| 5,258,217 A | | 11/1993 | Lewis |
| 5,259,697 A | | 11/1993 | Allen |
| 5,259,698 A | | 11/1993 | Garzon |
| 5,288,171 A | * | 2/1994 | Smith ............... B03B 9/065 |
| | | | 241/DIG. 38 |
| 5,325,642 A | | 7/1994 | Cooley |
| 5,374,139 A | | 12/1994 | Kugler |
| 5,460,867 A | | 10/1995 | Magnuson |
| 5,562,586 A | | 10/1996 | Hyde-Smith |
| 5,567,932 A | * | 10/1996 | Staller ............... G01M 3/38 |
| | | | 250/227.14 |
| 5,583,283 A | | 12/1996 | Hampton |
| 5,601,906 A | * | 2/1997 | Henry ............... B32B 27/02 |
| | | | 405/107 |
| 5,690,448 A | | 11/1997 | Fasullo |
| 5,823,711 A | | 10/1998 | Herd |
| 5,863,153 A | | 1/1999 | Bachell |
| 5,975,801 A | | 11/1999 | Burns |
| 5,976,645 A | | 11/1999 | Daluise |
| 6,004,070 A | | 12/1999 | Van Camp |
| 6,102,617 A | | 8/2000 | Hampton |
| 6,119,375 A | * | 9/2000 | Wilson, Sr. ............... B09B 1/00 |
| | | | 37/195 |
| 6,152,653 A | | 11/2000 | Henry |
| 6,386,796 B1 | * | 5/2002 | Hull ............... B09C 1/00 |
| | | | 405/128.1 |
| 6,558,081 B2 | | 5/2003 | Hull |
| 6,802,672 B2 | | 10/2004 | Hardin |
| 6,860,953 B1 | | 3/2005 | Grizzle |
| 6,877,932 B2 | | 4/2005 | PrL vost |
| 7,118,308 B2 | | 10/2006 | Hater |
| 7,244,477 B2 | | 7/2007 | Sawyer |
| 7,284,930 B2 | | 10/2007 | Shi |
| 7,309,188 B2 | | 12/2007 | Ianniello |
| 7,374,367 B2 | | 5/2008 | Chowdhury |
| 7,399,145 B2 | | 7/2008 | Clark |
| 7,682,105 B2 | | 3/2010 | Ayers |
| 7,699,562 B2 | | 4/2010 | Clark |
| 7,726,908 B2 | | 6/2010 | Wu |
| 8,240,959 B1 | | 8/2012 | Rhoades |
| 8,403,597 B2 | | 3/2013 | Ayers |
| 8,585,322 B2 | * | 11/2013 | Ayers ............... B09B 1/004 |
| | | | 405/129.7 |
| 8,622,654 B2 | | 1/2014 | Oliveira |
| 8,899,876 B2 | | 12/2014 | Suzanne |
| 9,151,009 B2 | | 10/2015 | Fleishman |
| 9,163,375 B2 | | 10/2015 | Ayers |
| 2007/0166508 A1 | | 7/2007 | Waterford |
| 2009/0050025 A1 | | 2/2009 | Wissa |
| 2009/0139927 A1 | * | 6/2009 | Kania ............... A01G 31/00 |
| | | | 210/602 |
| 2009/0288341 A1 | | 11/2009 | Kania |
| 2010/0005716 A1 | | 1/2010 | Byles |
| 2010/0239790 A1 | | 9/2010 | Stricklen |
| 2012/0063854 A1 | | 3/2012 | Ayers |
| 2012/0064262 A1 | | 3/2012 | Ayers |
| 2012/0064263 A1 | | 3/2012 | Ayers |
| 2014/0170339 A1 | | 6/2014 | Ayers |
| 2014/0270992 A1 | | 9/2014 | Ayers |
| 2014/0369762 A1 | * | 12/2014 | Albers ............... E03F 5/103 |
| | | | 405/129.6 |

OTHER PUBLICATIONS

Administrative Record Index of Documents, Standard Chlorine, CERCLIS ID: NJD002175057, accessed from https://semspub.epa.gov/work/02/395955.pdf on Jan. 18, 2018.*

Maritz Rykaart et al., State of the Art Review Covers, InfoMine, Mining Intellegence and Technology, www.onfomine.com, Jun. 28, 2006.

O'Malley, Paul, et al., An Innovative Cover System Ideally Suited to Coal Ash Impoundment Closure, 2015 World of Coal Ash (WOCA) Conference in Nasyhille, TN—May 5-7, 2015, http:llwww.flyashinfo/.

U.S. Department of Energy by CH2M-WG Idaho, LLC, Closure Plan for the Coal-Fired Steam Generating Facility Ash Bury Pit at the Idaho National Laboratory,Idaho Cleanup Project, Idaho Falls, Idaho 83415, Jun. 2005.

Brochure entitled Project Profile: Former Muskingum River Power Plant Redevelopment, Liability Transfer Company, Key Environmental, Inc., 2 pages.

Brochure entitled Sustainable Habitat Cover Systems for the Closure of Ash Facilities, Key Environmental, Inc., 2 pages.

Brochure entitled Sustainable Habitat, Key Environmental, Inc., 2 pages.

CCR Facility Closure—Former Frank Ratts Generating Station, Meeting held on Apr. 28, 2016, Indianapolis, IN, 24 pages.

Presentation entitled Conceptual Approach, CCR Facility Closure, Beckjord Power Station, Feb. 1, 2017, 29 pages.

Presentation entitled Discussion of Environmental Activitites, Muskingum River Plant, Waterford, OH, Key Environmental, Inc., Sep. 10, 2015, 17 pages.

Presentation entitled Sustainable Closure of Fly Ash Impoundments, USWAG CCR Workshop, Feb. 22-23, 2017, 18 pages.

Presentation entitled Sustainable Closure of Fly Ash Impoundments, World of Coal Ash Conference, May 8-11, 2017, 18 pages.

USWAG Poster entitled Sustainable Habitat Closure Overview, 3 pages.

United States Environmental Protection Agency (USEPA) Office of Site Remediation and Restoration (OSRR) Technical Memo, 1 page, Feb. 5, 2001.

* cited by examiner

Prior Art

WASTE DISPOSAL CLOSURE SYSTEM

CROSS-REFERENCE TO RELATED APPLICATIONS

This application claims the benefit of priority of U.S. Provisional Application No. 62/305,300, filed Mar. 8, 2016, and No. 62/457,577, filed Feb. 10, 2017, the disclosures of which are hereby incorporated by reference as if written herein in their entireties.

BACKGROUND

Many different industrial waste materials are managed by being placed into landfills or reservoirs. These varying waste materials are often considered to be a possible source of groundwater contamination. In an effort to protect human health and the environment, Federal and/or state environmental regulations require "closure" of such waste sites. Traditional closure is generally garnered by either leaving the waste in place and installing a "Cover System" or through the removal and decontamination of the waste site.

Cover Systems may differ from waste to waste and site to site, depending on state-specific requirements and site specific conditions. However, Cover Systems are normally comprised of layers of both manufactured materials and natural materials.

For example, according to the Ohio EPA Requirements, impoundment closure system for coal combustion residuals (CCRs) should include a minimum post-settlement slope of (1) percent, one (1) foot of suitable fertile soil cover for the top layer, and two (2) feet of clay/cohesive soil with a permeability of $1 \times 10^{-6}$ centimeters per second (cm/s) or less on top of the CCR.

Traditional closure systems requires heavy earthwork, in the form of material fill placement and/or waste stabilization, waste excavation and, movement, to achieve the minimum surface slopes required for installation of the Cover System. Earthwork on top of many waste material is often problematic due to the inadequate bearing capacity, potential for localized liquefaction, differential settlement, and inadequate slope stability. In some cases fatalities have occurred due to unstable conditions encountered during earthwork on the surface of waste disposal sites. In addition, the schedule and costs required to install a traditional Cover System in these conditions are excessive in comparison to construction over more stable materials.

This invention provides alternative, superior methods and materials for landfill or impoundment closure systems on waste disposal sites that can be utilized at less cost and with greater safety than traditional systems. Finally, the invention impounds shallow water on the Cover System (see FIG. 1), to provide superior and more diverse habitat in comparison to traditional closure systems (i.e., FIG. 2).

BRIEF DESCRIPTION OF THE FIGURES

The accompanying figures illustrate various embodiments of the present disclosure.

DETAILED DESCRIPTION

In reference to FIG. 1-7, because waste materials (5) are often placed into waste disposal sites in a flowable state the surface of the claimed impoundment sites tend to be relatively flat and may allow the low-permeability component or geomembrane (4) to be placed over the waste material (5) with minimal grading required. Cost savings can be had since the required heavy earthwork of the traditional closure system (FIG. 2) for the waste disposal sites may not be required.

Figure 1:
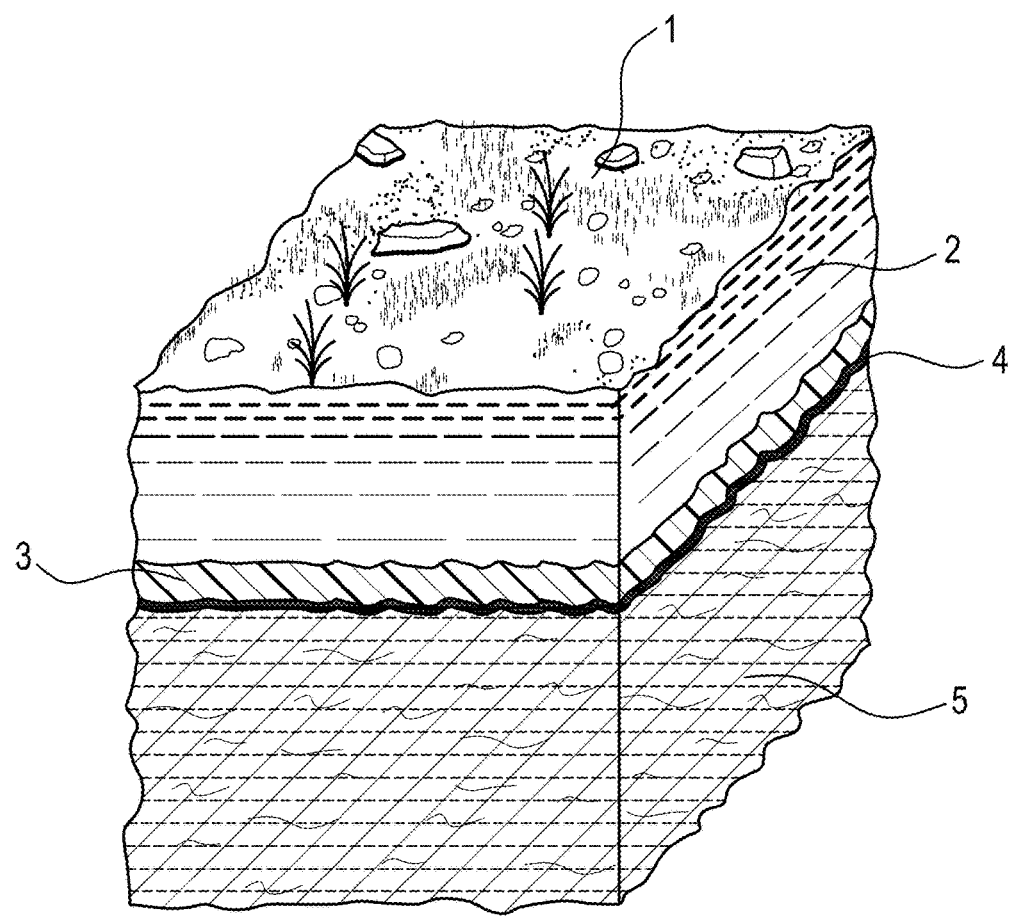
FIG. 1. Cut away view of an embodiment of the closure systems.

With reference to FIG. 1, an embodiment of the claimed invention wherein waste material (5) has a cover system installed by placing a low permeability component or geomembrane (4) on top of the waste material (5) or on top of a buffer liner that forms a buffer between the waste material (5) and the low-permeability component or geomembrane (4). The buffer liner can be a synthetic material, felt, soil or clay and or the like. The low-permeability component or geomembrane (4) is then covered by a protective cover layer (3) like soil, dirt, clay or the like. The protective cover layer (3) may be placed below an aquatic layer (2) which may have vegetation (1) placed in the aquatic layer (2) or may be in the protective layer (3) depending on the desired configuration. The vegetation (1) may lay on top of the protective cover layer (3) below the aquatic layer (2) surface. The vegetation (1) may also come out of the surface of the aquatic layer (2).

Figure 2:
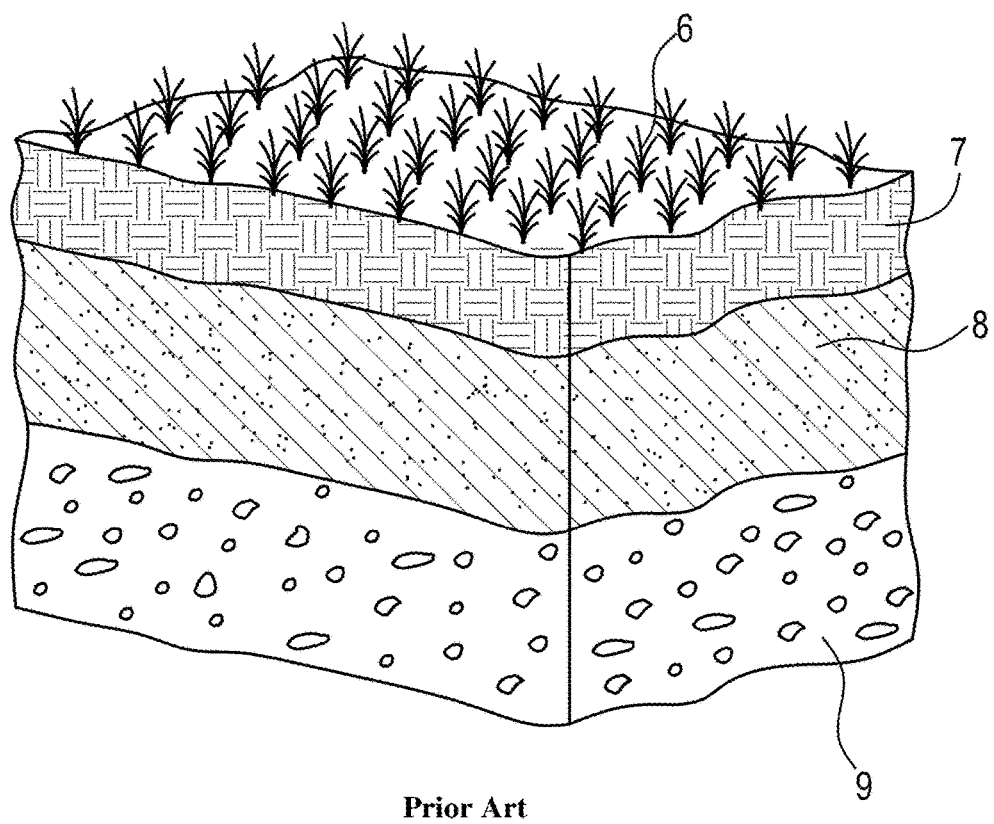
FIG. 2. A typical traditional sloped and drained coal combustion residual impoundment closure system from the prior art.

FIG. 2 is an example of standard CCR impound closure system wherein CCR (9) are covered by the low permeability clay/cohesive soil (8). Soil (7) is placed on top of the low permeability clay/cohesive soil (8) with vegetation (6) being placed on top of the fertile soil (7).

Figure 3:
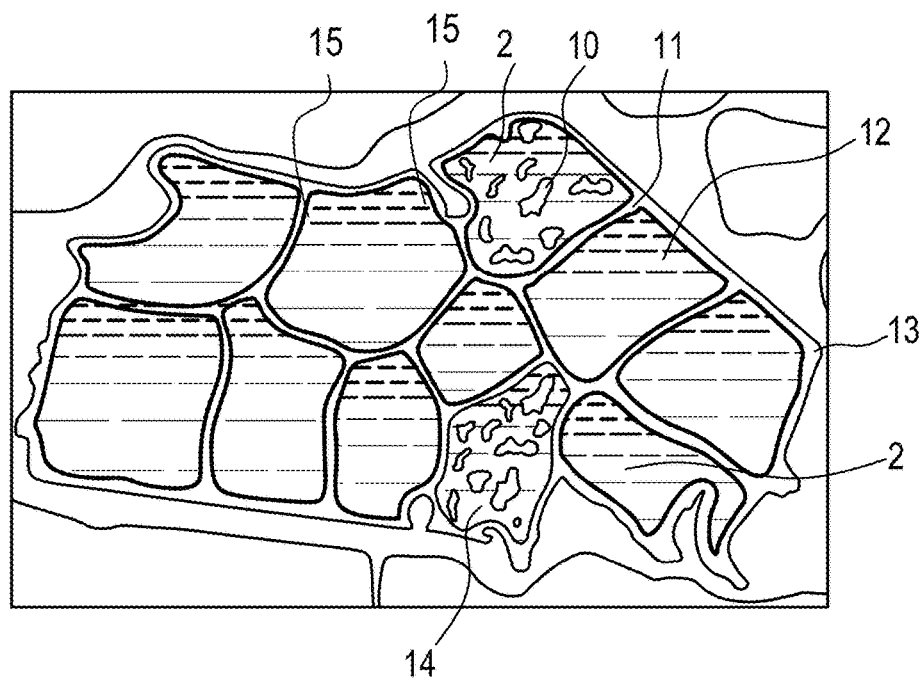
FIG. 3. An impoundment closure system embodiment.
Figure 4:
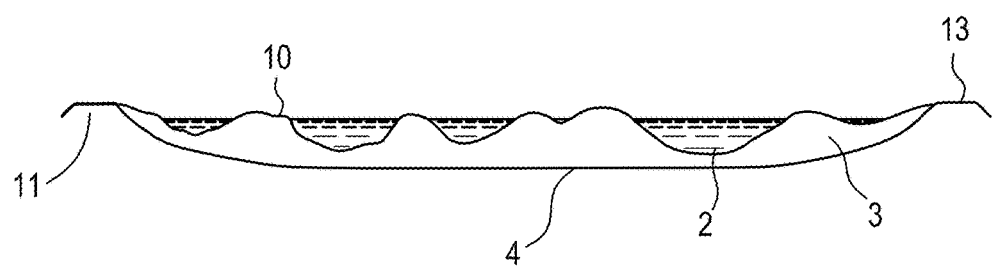
FIG. 4. An impoundment closure system embodiment with islands embodiment.

With reference to FIG. 3 there is disclosed an embodiment wherein the impoundment closure system comprises several possible cell configurations of the claimed invention. FIG. 3 contains an example of a habitat cell (12) that contains an aquatic area (2). FIG. 3 also contains an example of a habitat cell (14) wherein the cell contains aquatic layers (2) and islands (10). Different cells and habitat cells may be separated by separation components (11) with multiple ends (15). The impound enclosure system may be accessible by an access road (13). The islands (10) may be formed by using waste material (5) to build the islands with a low-permeability component or geomembrane (4) over the waste material (5). The islands (10) may also be formed out of the protective layer (3) as shown in FIG. 4. The low-permeability component or geomembrane (4) may be one continuous membrane for all of the cells in the claimed invention or the low-permeability component or geomembrane (4) may cover one cell at a time.

With reference to FIG. 4, shows an embodiment of the claimed invention wherein waste material (5) of FIG. 1 is covered by a low-permeability component or geomembrane (4). Protective material (3) is placed on top of the low-permeability component or geomembrane (4) and may be used to create islands (10). The protective material (3) can cover all or part of the low-permeability component or geomembrane (4) so as to leave the low-permeability component or geomembrane (4) partially exposed. The low-permeability component or geomembrane (4) may move over the edges of the cell and attach to separation components (11) or be placed under the separation component (11). FIG. 4 also contains an aquatic layer (2) that may cover parts of the protective layer (3) and leave parts of the protective layer (3) exposed so that the islands (10) are not covered by the aquatic layer (2). The embodiment of FIG. 4 contains a separation component (11) that the low-permeability component or geomembrane (4) may be attached to or separate from. The low-permeability component or geomembrane (4) may attach so that the ends of the low-permeability component or geomembrane (4) is higher than the aquatic layer (2). An access road (15) may be present to allow access to the embodiment of the claimed invention in FIG. 4 allowing access to the impoundment site or to place the low-permeability component or geomembrane (4), the protective layer (3), islands (10) and aquatic layer (2). The access road (13) may also be used to place any other requirements of claimed invention or allow installation or repair of claimed invention. In one embodiment the Protective material (3) is not used at all. In that case the aquatic layer (2) provides protection to a large part of the low-permeability component or geomembrane (4).

Figure 5:
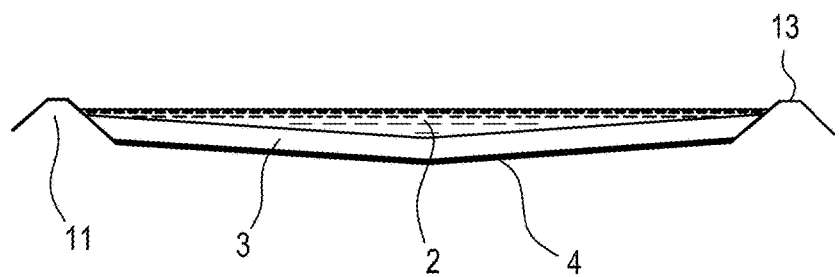
FIG. 5. An impoundment closure system embodiment without islands.

With reference to FIG. 5, an embodiment of the claimed invention wherein waste material (5) of FIG. 5 is covered by a low-permeability component or geomembrane (4). The low-permeability component or geomembrane (4) is then covered by a protective layer (3) wherein the protective layer (3) is graded so as to be completely covered by an aquatic layer (2). The embodiment of FIG. 5 also contains a berm (13) wherein the low-permeability component or geomembrane (4) may be attached to or separate from the berm (13). Additionally an access road (13) may be present to allow access so that low-permeability component or geomembrane (4), protective layer (3), and aquatic layer (2) may be placed for impoundment closure system or allow access to the impoundment site.

Figure 6:
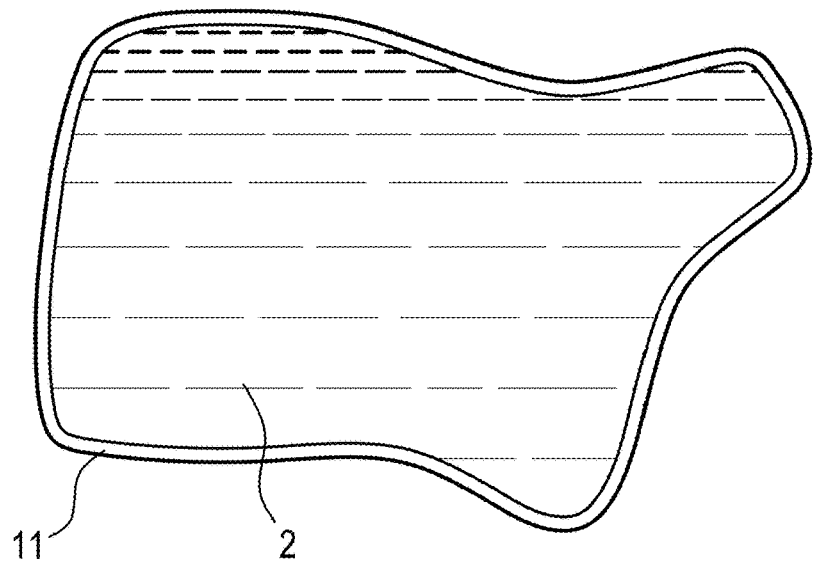
FIG. 6. A single cell example of the impoundment system without islands

With reference to FIG. 6, a cell configuration of an embodiment of the claimed invention wherein the cell in FIG. 6 contains a separation component (11) that surrounds and separates the cell from other possible cell environments. The cell of FIG. 6 contains an aquatic layer (2) that completely covers any other layers. Note FIG. 6 is an example of a single cell of the currently disclosed closure system or the whole system itself.

Figure 7:
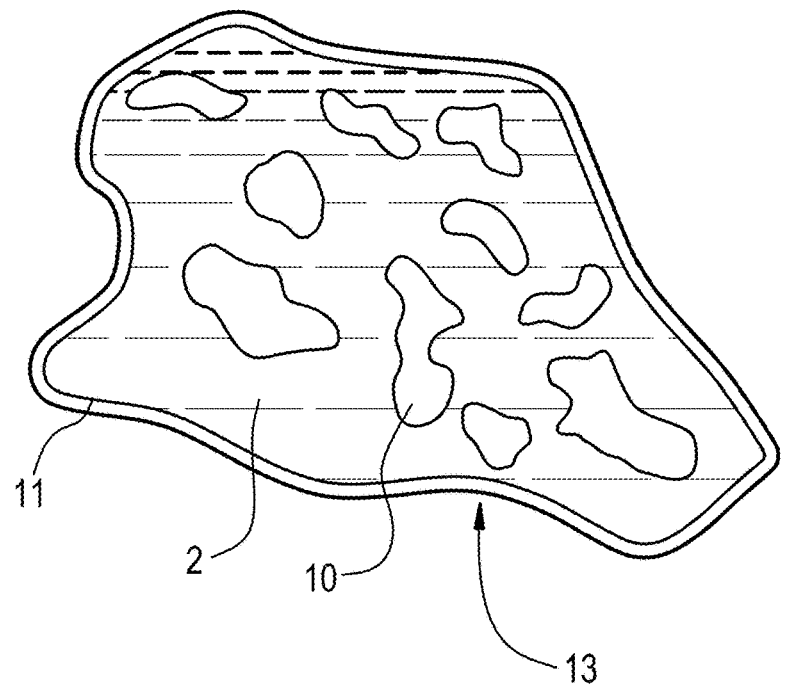
FIG. 7. A single cell example of the impoundment system with islands

With respect to FIG. 7, an embodiment of a cell in the claimed invention wherein the cell is separated from other cells by a separation component (11). The cell of FIG. 6 may be formed as FIG. 5 demonstrates with a separation component (11) attached to or separate from a low-permeability component or geomembrane (4). Note FIG. 7 is an example of a single cell of the currently disclosed closure system or the cell could be the whole closure system itself.

FIG. 7 contains islands (10) and an aquatic layer (2). The site may contain an access road (13) to access the embodied cell during the construction of the cell and after construction of the cell. The islands (10) may be formed using waste material (5) underneath a low-permeability component or geomembrane or as in FIG. 4 the islands may be formed by using a protective cover (3) on top of a low-permeability component or geomembrane (4).

In one embodiment, the low-permeability component or geomembrane (4) utilized may be any low permeability synthetic membranes available. In a further embodiment the low-permeability component or geomembrane may be aquatic-safe (e.g. acceptable toxicity testing results as demonstrated by testing performed in accordance with industry-standard protocols). Preferably the low-permeability component or geomembrane may be high-density polyethylene (HDPE), low-density polyethylene (LDPE), polyvinyl chloride (PVC), or ethylene propylene diene monomer (EPDM). Further embodiments may take into account that each specific low-permeability component or geomembrane exhibits different performance properties specific material selection may be made based on site-specific conditions such as anticipated settlement and corresponding material stress-strain characteristics. Further embodiments may select low-permeability component or geomembranes to provide adequate physical properties based on the site-specific conditions.

The surface of the waste material (5) disposal sites may require preparation prior to installation of the overlying low-permeability component or geomembrane. The purpose of the preparation is to remove or modify sharp protrusions or irregularities on the surface that could damage the low-permeability component or geomembrane. Because the waste disposal sites are prone to instability as described above and care may be given to closure activities, personnel safety may be considered when traversing the waste material surface and appropriate safety precautions may be taken and equipment utilized. In one embodiment the subgrade preparation may be performed from adjacent, stable surfaces, or with low ground pressure equipment and/or hand labor. In another embodiment the subgrade preparation may be performed with specialized equipment capable of operating on saturated material while protecting human health.

Following preparation of the waste material (5) surface, the low-permeability component or geomembrane (4) may be installed. The low-permeability component or geomembrane may be deployed in sections and rolls, and therefore may require overlap and seaming. Seaming methods may depend on the material selected but could include glue, tape, fusion welds or extrusion welds. At a minimum the low-permeability component or geomembrane (4) maybe anchored with an appropriate apertures, along its perimeter or along separation component (11). In one embodiment the low-permeability component or geomembrane may be anchored around the perimeter with an anchor trench. In another embodiment the low-permeability component or geomembrane may be anchored around the perimeter with means other than an anchor trench such as pins, earth anchors, or similar means. In one embodiment the low-permeability component may be put on top of the waste material and over on and the top of the berms as be attached to the edges of the waste impoundment site instead of being anchor at with each cell.

Depending on the site-specific conditions the low-permeability component or geomembrane may be continuous across the entire waste disposal site or it may be terminated to define individual cells.

Cells may impound shallow water before discharging through a reinforced outlet weir or other hydraulic connection means to other designed features of the sustainable habitat closure system. Cells could outlet to additional cells, common drainage features, or other determined site specific design features. Any reinforced outlet weirs may be constructed underneath the geomembrane with reinforcement on top of the geomembrane. Reinforced outlet weirs may implement a cushion geotextile and cover material above and/or below the geomembrane to protect the geomembrane from puncture, scour and abrasion. Sizing of the hydraulic connect and design of the reinforcement will be determined on site specific requirements. Construction of the hydraulic connection means will ensure the sustainable habitat cells maintain appropriate water levels in accordance with the approved design.

In some cases the sustainable habitat cells may cascade flow from one cell to another. In other applications of the invention, the cells may drain to a common drainage feature. This common drainage feature could be a common channel to convey flow. The common channel may be constructed underneath the geomembrane with reinforcement on top of the geomembrane. The common channel may implement a cushion geotextile and cover material above and/or below the geomembrane to protect the geomembrane from puncture, scour and abrasion. The common channel may also be utilized as an access point to the sustainable habitat. Sizing of the common channel and design of the reinforcement will be determined on site specific requirements. Construction of the common channel will ensure the sustainable habitat cells maintain appropriate water levels in accordance with the approved design.

In a preferred embodiment, a protective cover layer of material (3) is put on top of the low-permeability component or geomembrane (4). The cover layer material may be comprised of non-aggregate, natural soil material, based upon material availability, cost, and the desired sustainable habitat. In one embodiment the cover layer material may provide a suitable, location-specific substrate for sustainable habitat plant growth. Various types of vegetation (1) may be planted within or on top of the protective cover layer (3) to achieve the desired sustainable habitat in each of the cells (e.g. 12 and 14). In another embodiment the cover material may not be suitable for plant growth within or on and no plant growth may be promoted within or on the protective cover layer. The cover layer (3) material in one embodiment may be comprised of material with a minimum layer thickness of six inches on top of the low-permeability component or geomembrane (4). The cover layer material may exhibit acceptable contamination levels as demonstrated by testing performed in accordance with industry-standard protocols. The character of the cover layer material may be selected based on site-specific conditions. The protective cover layer can perform one of more of the following: 1) It can protect the low-permeability component or geomembrane (4) from exposure to UV rays. 2) It can protect the low-permeability component or geomembrane (4) from damage from wildlife. 3) It may provide mass to hold the low-permeability component or geomembrane in place (4) It can provide a substrate for vegetation and 5) a potential place to put unwanted soil. In one embodiment the cover material is not mechanically placed and compacted but can be pumped into place. In another embodiment is the use of a synthetic turf over the low-permeability component or geomembrane instead of protective cover material (3). The synthetic turf may be anchored by placement of a thin layer of sand or similar natural material on top. A protective cover layer might not be used in appropriate situations. In those case care must be taken to select a low-permeability component or geomembrane that does not require the benefits of the protective cover layer.

In one embodiment, the closure system may be constructed such that there are hydraulically discrete cells (e.g. 12 and 14). The cells may be constructed by creating a prominence out of the waste material to create the separation component. In general the final graded surface to create the separation component between cells may be less than 5%. In one embodiment the separation component is created below the low-permeability component or geomembrane. In another embodiment the separation component is constructed top of the low-permeability component or geomembrane.

In another embodiment the cells may be created through the construction of berms as the separation component. The berms may be constructed of low permeability material or alternative suitable site-specific material. In another embodiment the berms are not low permeability. The berms may also be utilized to provide access for construction equipment and low-permeability component or geomembrane deployment during cover system construction. The berms may provide an anchorage media for the edges of the low-permeability component or geomembrane (4). In another embodiment the low-permeability component or geomembrane may pass continuously beneath, over, or through the berms and be attached to the edges of the impoundment closure system. In another embodiment the low-permeability component or geomembrane (4) is attached to the berm (13) of each cell (12 or 13)

Alternatively in another embodiment the entire landfill or impoundment may be a single cell.

The slope of the low-permeability component and protective cover layer material (3) may be selected, in conjunction with the separation component (11) heights and hydraulic connection appurtenances, to provide the required height and duration of impounded water required to support the desired habitat. Unlike a traditional cover system (FIG. 2) the slope of the present system may be flat (e.g. ~0 percent slope). Typical impoundment closure systems as shown in FIG. 2 require a slope of at least 1% slope to assure water may drain off of the impoundment site. Monitoring of this slope and any settling issues are normally required to ensure that water does not collect on top of the clay cap (aka ponding).

In one embodiment sensors can be placed within the waste material (5) or between the waste material (5) and low-permeability component or geomembrane (4) to monitor for changes in the waste (5) environment (e.g. such as water seeping into the waste material or changes in the property of the waste material (5). If the cells (e.g. 12 and 14) are hydraulically discrete and one of the sensors detects an issue corrective measures can be made by draining just the cell (e.g. 12 and 14) where the problem has been detected and not the entire site.

The sensors which may be utilized with respect to the invention could be lysimeters, piezometers, tensiometers, or other instruments deemed pertinent to the monitoring of the sustainable habitat closure system. The sensors may be installed temporarily within the waste material during construction activities to monitor construction conditions. The sensors may be installed permanently to measure long term performance of the sustainable habitat closure system. The sensors may be installed above the geomembrane to monitor the conditions in the protective cover layer material and aquatic layer or below the geomembrane to monitor the conditions of the waste material. In some cases sensors may be required after completion of the closure system, if sensors are installed within the waste material any punctures of the geomembrane and disturbance of the cover layers will be repaired.

In one embodiment the present system can be constructed on any waste landfill or impoundment. It could be any waste site required to close with a low permeability cover system, to be acceptable to the Federal and/or state environmental regulatory agencies.

In one embodiment of the invention, a cover system may contain a low permeability component, a protective layer component, an access component, and a slope to accommodate ponding of water.

In one embodiment of the invention, the impoundment site may be closed by covering the entire site in a low-permeability component or geomembrane that creates a continuous area and allowing a pond to form on top of the a low-permeability component or geomembrane.

In one embodiment of the invention the separation components can be created on top of a low-permeability component or geomembrane liner.

In one embodiment of the invention, a cover system may contain a low permeability component, a protective layer component, a component to promote shallow ponding of water, and a slope to accommodate ponding of water.

In one embodiment of the invention, a cover system may contain a low permeability component, a protective layer component, a segregation component, and a slope to accommodate ponding of water.

In another embodiment of the invention a cover system may contain a low-permeability component or geomembrane as a low permeability component.

In another embodiment of the invention a cover system may contain a minimum of six inches of soil as a protective layer component.

In another embodiment of the invention a cover system may contain grading and other constructed features to provide access for low-permeability component or geomembrane installation.

In another embodiment of the invention a cover system may contain grading and other constructed features to promote shallow ponding of water.

In another embodiment of the invention a cover system may contain grading and other constructed features to segregate for a variety of sustainable habitats.

In another embodiment of the invention a cover system may contain grading and other constructed features to provide access for recreation foot traffic.

In another embodiment of the invention a cover system may contain minimal slope to accommodate ponding of water required for a sustainable habitat.

In another embodiment of the invention a cover system may contain a minimal slope of zero (0) to two (2) percent.

In one embodiment of the invention a manufactured low-permeability component or geomembrane may be placed directly over the waste surface.

In another embodiment of the invention the waste surface may be inspected to minimize the potential for intrusions of a low permeability component.

In another embodiment of the invention the waste surface may have a protective material placed below the low permeability component.

In another embodiment of the invention the protective material below the low permeability component may be an additional low-permeability component or geomembrane.

In another embodiment of the invention a protective material will be determined based upon site-specific conditions and may lie below or above the low permeability component.

In another embodiment of the invention a geosynthetic clay liner may be placed below the low permeability component.

In another embodiment of the invention, a low-permeability component or geomembrane may be made from one of the following: high-density polyethylene, ethylene propylene diene monomer, polypropylene, or polyvinyl chloride.

In another embodiment of the invention, a low-permeability component or geomembrane material may be determined based upon site-specific conditions.

In another embodiment of the invention, a low-permeability component or geomembrane material may be determined by anticipated settlement.

In another embodiment of the invention, a low-permeability component or geomembrane material may be determined by corresponding low-permeability component or geomembrane stress-strain characteristics.

In another embodiment of the invention, a low-permeability component or geomembrane material may be aquatic-safe.

In another embodiment of the invention, a low-permeability component or geomembrane material may exhibit acceptable toxicity tests results.

In a further embodiment of the invention, a low-permeability component or geomembrane material may exhibit acceptable toxicity tests results as demonstrated by testing performed in accordance with industry-standard protocols.

In another embodiment of the invention, a protective cover layer may contain a layer of material.

In another embodiment of the invention a protective cover layer is placed on top of a low permeability component or low-permeability component or geomembrane and cover at least 25%, 50% or 75% of the permeability component.

In another embodiment of the invention the low permeability component is a geomembrane.

In another embodiment of the invention a protective cover layer is at least six inches thick.

In another embodiment of the invention a protective cover layer may exhibit acceptable contamination levels.

In another embodiment of the invention a protective cover layer may exhibit acceptable contamination levels as demonstrated by testing performed in accordance with industry-standard protocols.

In another embodiment of the invention a protective cover layer is comprised of less than six inches of material.

In another embodiment of the invention a protective cover layer comprised of suitable material may exhibit acceptable contamination levels.

In another embodiment of the invention a protective cover layer comprised of suitable material may exhibit acceptable contamination levels as demonstrated by testing performed in accordance with industry-standard protocols.

In another embodiment of the invention, a protective cover layer may be selected based on site-specific conditions.

In another embodiment of the invention, a protective layer comprised of suitable material may be selected based on site-specific conditions.

In another embodiment of the invention a protective cover layer may be selected to provide for sustainable habitat plant growth.

In another embodiment of the invention a protective cover layer may be selected based on site-specific conditions to provide a suitable, location specific substrate for aquatic habitat plant growth.

In another embodiment of the invention, a protective cover layer may contain vegetation.

In another embodiment of the invention, a protective layer may contain vegetation to achieve a sustainable habitat.

In another embodiment of the invention, a separation component may be constructed between aquatic habitat cells.

In another embodiment of the invention, a separation component may be berms.

In another embodiment of the invention a separation component may provide an anchorage media for the edges of a low permeability component.

In another embodiment of the invention, a separation component provides an anchorage media for the edges of a low-permeability component or geomembrane.

In another embodiment of the invention, a separation component is constructed from low permeability soil.

In another embodiment of the invention, a separation component is constructed from a suitable synthetic material.

In another embodiment of the invention, a separation component is constructed from a geotube or similar technology.

In another embodiment of the invention, a separation component is constructed from low permeability soil, such that a sustainable habitat cell can impound surface water independently.

In another embodiment of the invention, one or more cells are hydraulically connected.

In another embodiment of the invention a separation component divides a sustainable habitat into one or more cells.

In another embodiment of the invention a hydraulic connection between one or more aquatic habitat cells may be provided by culverts, overflow weirs, or other means.

In another embodiment of the invention the aquatic layer may not retain water year round.

In another embodiment of the invention, a slope of the permeability layer and protective cover layer may be selected to provide a desired height and duration of impounded water required to support a sustainable habitat.

In another embodiment of the invention a slope may be selected based upon a permeability component, a protective cover layer, the height of a separation component, and hydraulic connection appurtenance positions to provide a desired height and duration of impounded water required to support an aquatic habitat.

In another embodiment of the invention a low permeability component may be constructed at a zero (0) percent slope.

In another embodiment of the invention a low permeability component may be constructed at a slope greater than zero (0) percent.

In another embodiment of the invention a zero (0) percent surface slope may be selected based upon a permeability component, a protective cover layer, the height of a separation component, and hydraulic connection appurtenance positions to provide a desired height and duration of impounded water required to support a sustainable habitat.

In another embodiment of the invention a greater than zero (0) percent surface slope may be selected based upon a permeability component, a protective cover layer, the height of a separation component, and hydraulic connection appurtenance positions to provide a desired height and duration of impounded water required to support an sustainable habitat.

In another embodiment of the invention aquatic plants or fish may be placed within the aquatic layer.

In another embodiment of the invention, the water material may be natural grade or less than 1% slope.

In one embodiment, the invention may be an impoundment closure system comprising: a waste impoundment site having a plurality of separation components to form a plurality cells; a low-permeability component with multiple ends on the top of a waste material within each of said plurality cells and is permanently attached at said ends to said separation components or to the edges of said waste impoundment site; a protective cover layer on top of said low-permeability component; and an aqueous layer on top of said protective cover layer.

In one embodiment, the invention may be an impoundment closure system comprising: a waste impoundment site where the waste material which could be coal combustion residuals, having a plurality of separation components to form a plurality cells; a low-permeability component with multiple ends on the top of coal combustion residuals within each of said plurality cells and is permanently attached at said ends to said separation components; a protective cover layer on top of said low-permeability component; and an aqueous layer on top of said protective cover layer.

In one embodiment, the invention may be an impoundment closure system comprising: a waste impoundment site comprised of a waste material where the a waste impoundment site is conformed to have a plurality of separation components to form a plurality cells; a low-permeability component with multiple ends on the top of a waste material within each of said plurality cells and is permanently attached at said ends to said separation components; a protective cover layer on top of said low-permeability component; an aqueous layer on top of said protective cover layer; and the waste impoundment is less than 1% slope-post settlement.

In one embodiment, the invention may be an impoundment closure system comprising: a waste impoundment site, with the waste material being mostly coal fly ash, having a plurality of separation components to form a plurality cells; a low-permeability component with multiple ends on the top of coal fly ash within each of said plurality cells and is permanently attached at said ends to said separation components of each of the cells; a protective cover layer on top of said low-permeability component; and an aqueous layer on top of said protective cover layer.

In one embodiment, the invention may be an impoundment closure system comprising: a waste impoundment site having a plurality of separation components to form a plurality cells; a low-permeability component with multiple ends on the top of a waste material, having a natural grade, within each of said plurality cells and is permanently attached at said ends to said separation components; a protective cover layer on top of said low-permeability component; and an aqueous layer on top of said protective cover layer.

In one embodiment, the invention may be an impoundment closure system comprising: a waste impoundment site having a plurality of separation components to form a plurality cells wherein water is able to cascade from one cell to the other; a low-permeability component with multiple ends on the top of a waste material within each of said plurality cells and is permanently attached at said ends to said separation components; a protective cover layer on top of said low-permeability component; and an aqueous layer on top of said protective cover layer.

In one embodiment, the invention may be an impoundment closure system comprising: a waste impoundment site having a plurality of separation components formed from the waste material at the waste impoundment site to form a plurality cells; a low-permeability component with multiple ends on the top of a waste material within each of said plurality cells and is permanently attached at said ends to said separation components; a protective cover layer on top of said low-permeability component; an aqueous layer on top of said protective cover layer; and sensors are in said or on top of said waste residual.

In one embodiment, the invention may be an impoundment closure system comprising: a waste impoundment site having a plurality of separation components to form a plurality cells; a low-permeability component with multiple ends on the top of a waste material within each of said plurality cells and is permanently attached at said ends to said separation components; a protective cover layer on top of said low-permeability component; and an aqueous layer on top of said protective cover layer.

In one embodiment, the invention is a method of closing an water coal ash impoundment site comprising: dewatering of coal ash impoundments; forming a plurality of separation components to form a plurality cells on top of said coal ash impoundments; installing a low-permeability component with multiple ends on the top of said coal ash impoundments within each of said plurality of cells and permanently attaching said ends to said separation components; creating a protective cover layer on top of said low-permeability component; and allowing an aqueous layer to form on top of said protective cover layer.

In one embodiment, the invention is a method of closing an water coal ash impoundment site comprising: dewatering of coal ash impoundments; installing a low-permeability component with multiple ends on the top of said coal ash impoundments; optionally creating a protective cover layer on top of said low-permeability component; and allowing an aqueous layer to form on top of said low-permeability component.

In one embodiment, the invention is a method of closing an water coal ash impoundment site comprising: dewatering of coal ash impoundments; installing a low-permeability component with multiple ends on the top of said coal ash impoundments; creating a protective cover layer on top of said low-permeability component; and allowing an aqueous layer to form on top of said protective cover layer.

In one embodiment, the invention is a method of closing an water coal ash impoundment site comprising: dewatering of coal ash impoundments; installing a low-permeability component with multiple ends on the top of said coal ash impoundments; and allowing an aqueous layer to form on top of said low-permeability component.

In one embodiment, the claimed invention is an impoundment closure system comprising: a waste impoundment site; a low-permeability component with multiple ends on the top of waste residual permanently attached at said ends to edge of said waste impoundment site; a protective cover layer on top of said low-permeability component; and an aqueous layer on top of said protective cover layer.

In one embodiment, the invention is a waste disposal closure system comprising: a waste disposal site; a low-permeability component or geomembrane, made from high density polyethylene, low density polyethylene, polyvinyl chloride, or ethylene propylene diene monomer, on top of said waste disposal site; and an aqueous layer on top of said low permeability component.

In one embodiment, the invention is a waste disposal closure system comprising: a waste disposal site; a low permeability component on top of said waste disposal site; and an aqueous layer on top of said low permeability component.

In one embodiment, the invention is a waste disposal closure system comprising: a waste disposal site; a low permeability component on top of said waste disposal site; a protective cover layer on top of said low permeability component; and an aqueous layer on top of said protective cover layer.

In one embodiment, the invention is a waste disposal closure system comprising: a waste disposal site; a low permeability component on top of said waste disposal site; a protective cover layer at least 6 inches deep on top of said low permeability component; and an aqueous layer on top of said protective cover layer.

In one embodiment, the invention is a waste disposal closure system comprising: a waste disposal site containing waste material wherein said waste material will create at least one separation component; said separation component having less than 5% slope as a final grade; a low permeability low-permeability component or geomembrane installed on said waste material and permanently attached at said ends to perimeter of said waste disposal site wherein said low-permeability component or geomembrane comprises multiple panels connected together; a protective cover layer on top of said low permeability membrane wherein said protective cover layer is at least 6 inches deep; an aqueous layer on top of said protective cover layer wherein said aqueous layer is less than 18 inches deep; and a drainage feature.

In one embodiment, the claimed invention is a method of making a waste disposal closure system comprising: eliminating standing water within the waste disposal site; preparing waste surface for deployment of a low permeability component; deployment deploying said low-permeability component; and placing an aqueous layer on top of said low-permeability component.

In one embodiment, the invention is a method of making a waste disposal closure system comprising: eliminating standing water within the waste disposal site; preparing waste surface for deployment of a low permeability component; deployment deploying said low-permeability component; placing an aqueous layer on top of said low-permeability component; and installing erosion and sediment control at site.

In one embodiment, the invention is a method of making a waste disposal closure system comprising: preparing waste within waste disposal site; deploying a low permeability component: using a low-permeability component or geomembrane as said low-permeability component; and placing or allowing an aqueous layer to form on top of said low permeability component.

An impoundment closure system comprising: a waste impoundment site comprising coal combustion residuals wherein a plurality of separation components are formed from said coal combustion residuals to form a plurality of cells; a low-permeability component on the top of said waste material; a protective cover layer on top of said low-permeability component; and an aqueous layer on top of said protective cover layer.

An impoundment closure system comprising: a waste impoundment site comprising waste material wherein a plurality of separation components are formed from said waste material to form a plurality of cells; a low-permeability component on the top of said waste material; a protective cover layer on top of said low-permeability component; and an aqueous layer on top of said protective cover layer.

An impoundment closure system comprising: a waste impoundment site comprising waste material wherein a plurality of separation components are formed from said waste material to form a plurality of cells; a low-permeability component, where there is at least a 30.5% reduction in percolation through the low permeability component as compared to a clay cover system wherein the clay cover system is 2 feet thick with a permeability of $1 \times 10^{-6}$ (cm/s), on the top of said waste material; a protective cover layer on top of said low-permeability component; and an aqueous layer on top of said protective cover layer.

An impoundment closure system comprising: a waste impoundment site comprising waste material wherein a plurality of separation components are formed from said waste material to form a plurality of cells; a low-permeability component, which allows for no more than 5.05 inches of annual percolation, on the top of said waste material; a protective cover layer on top of said low-permeability component; and an aqueous layer on top of said protective cover layer.

An impoundment closure system comprising: a waste impoundment site comprising waste material wherein a plurality of separation components are formed from said waste material to form a plurality of cells; a low-permeability component, has at least 86.3% cap efficiency, on the top of said waste material; a protective cover layer on top of said low-permeability component; and an aqueous layer on top of said protective cover layer. The United States Environmental Protection Agency (USEPA) Office of Site Remediation and Restoration (OSRR) Technical Memo defines "cap efficiency" as the sum of the percentage of percolation lost to runoff, evapotranspiration, and lateral drainage, and changes in the water storage system.

An impoundment closure system comprising: a waste impoundment site comprising waste material wherein a plurality of separation components are formed from said waste material to form a plurality of cells; a low-permeability component on the top of and anchored into said waste material; a protective cover layer on top of said low-permeability component; and an aqueous layer on top of said protective cover layer.

An impoundment closure system comprising: a waste impoundment site comprising waste material wherein a plurality of separation components are formed from said waste material to form a plurality of cells; a geomembrane, comprising multiple panels connected together, on the top of said waste material; a protective cover layer on top of said geomembrane; and an aqueous layer on top of said protective cover layer.

An impoundment closure system comprising: a waste impoundment site comprising waste material wherein a plurality of separation components are formed from said waste material to form a plurality of cells; a low-permeability component on the top of said waste material; a protective cover layer on top of said low-permeability component; an aqueous layer on top of said protective cover layer; and islands are present within one more cell(s).

An impoundment closure system comprising: a waste impoundment site comprising waste material wherein a plurality of separation components are formed from said waste material to form a plurality of cells; a low-permeability component on the top of said waste material; a protective cover layer covering more than 50% of said low-permeability component, on top of said low-permeability component; and an aqueous layer on top of said protective cover layer.

A method of closing an water coal ash impoundment site comprising: dewatering of coal ash impoundments; forming a plurality of separation components to form a plurality cells on top of said coal ash impoundments; installing a low-permeability component with multiple ends on the top of said coal ash impoundments within each of said plurality of cells and permanently attaching said ends to said separation components; creating a protective cover layer on top of said low-permeability component; and allowing an aqueous layer to form on top of said protective cover layer.

A method of closing an water coal ash impoundment site comprising: dewatering of coal ash impoundments; forming a plurality of separation components to form a plurality cells on top of said coal ash impoundments; installing a low-permeability component with multiple ends on the top of said coal ash impoundments within each of said plurality of cells and permanently attaching said ends to said separation components; creating a protective cover layer on top of said low-permeability component; allowing an aqueous layer to form on top of said protective cover layer; and comprising grading said coal ash impoundments to be less than 1% slope post-settlement.

A waste disposal closure system comprising: a waste disposal site containing waste material wherein said waste material will create at least one separation component; said separation component having less than 5% slope as a final grade; a low-permeability component on top of said waste material and permanently attached at said ends to perimeter of said waste disposal site wherein said low-permeability component comprises multiple panels connected together; a protective cover layer on top of said low permeability component wherein said protective cover layer is at least 6 inches deep; an aqueous layer on top of said protective cover layer; and a drainage duct for water to exit said waste disposal site.

A method of making a waste disposal closure system comprising: eliminating standing water within a waste disposal site; grading the surface of said waste disposal site for deployment of a low permeability component; deploying a low-permeability component along the top of said waste disposal site; allowing an aqueous layer to form on top of said low-permeability component; and constructing at least one island in said waste disposal site.

An impoundment closure system comprising: a waste impoundment site comprising waste material; a low-permeability component on the top of said waste material; a protective cover layer is on top of said low-permeability component; an aqueous layer on top of said protective cover layer; and said protective cover layer covers more than 50% of said low-permeability component.

An impoundment closure system comprising: a waste impoundment site comprising waste material; a low-permeability component on the top of said waste material; an aqueous layer on top of said low-permeability component; and said waste material has a slope of less than 1%.

An impoundment closure system comprising: a waste impoundment site comprising waste material; a low-permeability component on the top of said waste material; an aqueous layer on top of said low-permeability component; and said waste impoundment site has less than 1% slope.

An impoundment closure system comprising: a waste impoundment site comprising waste material; a low-permeability component on the top of said waste material; an aqueous layer on top of said low-permeability component; and there is at least a 30.5% reduction in percolation through the low permeability component as compared to a clay cover system wherein the clay cover system is 2 feet thick with a permeability of $1 \times 10^{-6}$ (cm/s).

An impoundment closure system comprising: a waste impoundment site comprising waste material; a low-permeability component on the top of said waste material; an aqueous layer on top of said low-permeability component; and said low-permeability component allows for no more than 5.05 inches of annual percolation.

An impoundment closure system comprising: a waste impoundment site comprising waste material; a low-permeability component on the top of said waste material; an aqueous layer on top of said low-permeability component; and the low-permeability component has at least 86.3% cap efficiency.

A method of making a waste disposal closure system comprising: preparing a waste disposal site for the deployment of a low-permeability component; deploying said low-permeability component on the surface of said waste disposal site; and allowing an aqueous layer to form on top of said geomembrane.

A method of making a waste disposal closure system comprising: preparing a waste disposal site for the deployment of a geomembrane; deploying said low-permeability component on the surface of said waste disposal site; placing a protective cover layer over said low-permeability component; and allowing an aqueous layer to form on top of said geomembrane;

A method of making a waste disposal closure system comprising: preparing a waste disposal site for the deployment of a low-permeability component; deploying said low-permeability component on the surface of said waste disposal site; and allowing an aqueous layer to form on top of said geomembrane; forming a plurality of separation components to form a plurality of cells.

A method of making a waste disposal closure system comprising: preparing a waste disposal site for the deployment of a low-permeability component; deploying said low-permeability component on the surface of said waste disposal site; allowing an aqueous layer to form on top of said geomembrane; and forming features in said aqueous layer.

In one embodiment, the claimed invention is a waste disposal closure system consisting essentially of: a waste disposal site; a low permeability component on top of said waste disposal site; and an aqueous layer on top of said low permeability component.

In one embodiment, the claimed invention is a waste disposal closure system consisting of: a waste disposal site; a low permeability component on top of said waste disposal site; and an aqueous layer on top of said low permeability component In one embodiment, the claimed invention is a waste disposal closure system consisting of: a waste disposal site; a low permeability component on top of said waste disposal site; a protective cover layer on top of said low permeability component; and an aqueous layer on top of said protective cover layer.

In one embodiment, the claimed invention is a waste disposal closure system consisting essentially of: a waste disposal site; a low permeability component on top of said waste disposal site; a protective cover layer on top of said low permeability component; and an aqueous layer on top of said protective cover layer.

In one embodiment, the claimed invention is a method of making a waste disposal closure system consisting of: preparing waste within waste disposal site; deploying a low permeability component; and placing an aqueous layer on top of said low permeability component.

In one embodiment, the claimed invention is a method of making a waste disposal closure system consisting essentially of: preparing waste within waste disposal site; deploying a low permeability component; and placing an aqueous layer on top of said low permeability component.

In one embodiment, the claimed invention is a method of making a waste disposal closure system consisting of: preparing waste within waste disposal site; deploying a low permeability component; placing an aqueous layer on top of said low permeability component; and placing a protective cover layer on said low permeability component.

In one embodiment, the claimed invention is a method of making a waste disposal closure system consisting essentially of: preparing waste within waste disposal site; deploying a low permeability component; placing an aqueous layer on top of said low permeability component; and placing a protective cover layer on said low permeability component.

A method of making a waste disposal closure system consisting of: preparing a waste disposal site for the deployment of a low-permeability component; deploying said low-permeability component on the surface of said waste disposal site; and allowing an aqueous layer to form on top of said low-permeability component.

A method of making a waste disposal closure system consisting essentially of: preparing a waste disposal site for the deployment of a low-permeability component; deploying said low-permeability component on the surface of said waste disposal site; and allowing an aqueous layer to form on top of said low-permeability component.

An impoundment closure system comprising: a waste impoundment site comprising waste material wherein a plurality of separation components are formed from said waste material to form a plurality of cells; a low-permeability component on the top of said waste material; a protective cover layer on top of said low-permeability component; and an aqueous layer on top of said protective cover layer.

An impoundment closure system consisting of: a waste impoundment site comprising waste material wherein a plurality of separation components are formed from said waste material to form a plurality of cells; a low-permeability component on the top of said waste material; a protective cover layer on top of said low-permeability component; and an aqueous layer on top of said protective cover layer.

An impoundment closure system consisting essentially of: a waste impoundment site comprising waste material wherein a plurality of separation components are formed from said waste material to form a plurality of cells; a low-permeability component on the top of said waste material; a protective cover layer on top of said low-permeability component; and an aqueous layer on top of said protective cover layer.

A method of closing an water coal ash impoundment site comprising: dewatering of coal ash impoundments; forming a plurality of separation components to form a plurality cells on top of said coal ash impoundments; installing a low-permeability component with multiple ends on the top of said coal ash impoundments within each of said plurality of cells and permanently attaching said ends to said separation components; creating a protective cover layer on top of said low-permeability component; an allowing an aqueous layer to form on top of said protective cover layer.

A method of closing an water coal ash impoundment site consisting of: dewatering of coal ash impoundments; forming a plurality of separation components to form a plurality cells on top of said coal ash impoundments; installing a low-permeability component with multiple ends on the top of said coal ash impoundments within each of said plurality of cells and permanently attaching said ends to said separation components; creating a protective cover layer on top of said low-permeability component; an allowing an aqueous layer to form on top of said protective cover layer.

A method of closing an water coal ash impoundment site consisting essentially of: dewatering of coal ash impoundments; forming a plurality of separation components to form a plurality cells on top of said coal ash impoundments; installing a low-permeability component with multiple ends on the top of said coal ash impoundments within each of said plurality of cells and permanently attaching said ends to said separation components; creating a protective cover layer on top of said low-permeability component; an allowing an aqueous layer to form on top of said protective cover layer.

A waste disposal closure system comprising: a waste disposal site containing waste material wherein said waste material will create at least one separation component; said separation component having less than 5% slope as a final grade; a low-permeability component on top of said waste material and permanently attached at said ends to perimeter of said waste disposal site wherein said low-permeability component comprises multiple panels connected together; a protective cover layer on top of said low permeability component wherein said protective cover layer is at least 6 inches deep; an aqueous layer on top of said protective cover layer; and a drainage duct for water to exit said waste disposal site.

A waste disposal closure system consisting of: a waste disposal site containing waste material wherein said waste material will create at least one separation component; said separation component having less than 5% slope as a final grade; a low-permeability component on top of said waste material and permanently attached at said ends to perimeter of said waste disposal site wherein said low-permeability component comprises multiple panels connected together; a protective cover layer on top of said low permeability component wherein said protective cover layer is at least 6 inches deep; an aqueous layer on top of said protective cover layer; and a drainage duct for water to exit said waste disposal site.

A waste disposal closure system consisting essentially of: a waste disposal site containing waste material wherein said waste material will create at least one separation component; said separation component having less than 5% slope as a final grade; a low-permeability component on top of said waste material and permanently attached at said ends to perimeter of said waste disposal site wherein said low-permeability component comprises multiple panels connected together; a protective cover layer on top of said low permeability component wherein said protective cover layer is at least 6 inches deep; an aqueous layer on top of said protective cover layer; and a drainage duct for water to exit said waste disposal site.

A method of making a waste disposal closure system comprising: eliminating standing water within a waste disposal site; grading the surface of said waste disposal site for deployment of a low permeability component; deploying a low-permeability component along the top of said waste disposal site; and allowing an aqueous layer to form on top of said low-permeability component.

A method of making a waste disposal closure system consisting of: eliminating standing water within a waste disposal site; grading the surface of said waste disposal site for deployment of a low permeability component; deploying a low-permeability component along the top of said waste disposal site; and allowing an aqueous layer to form on top of said low-permeability component.

A method of making a waste disposal closure system consisting essentially of: eliminating standing water within a waste disposal site; grading the surface of said waste disposal site for deployment of a low permeability component; deploying a low-permeability component along the top of said waste disposal site; and allowing an aqueous layer to form on top of said low-permeability component.

All of the embodiments may also use "consisting of" or "consisting essentially of" instead of "comprising" in the embodiment description.

Example I

The major construction activities associated with the disclosed waste disposal closure system and their sequence are presented to provide a general understanding of systems implementation. The sequence of construction is provided for illustrative purposes and may be modified provided that any permit conditions, design criteria, and erosion, sediment, and storm water management practices are met. The major construction activities will consist of the following:

Based on the site specific conditions and the proposed waste disposal unit closure system design evaluate and identify potential soil erosion, sedimentation and runoff risks, which would arise during construction. Install the necessary erosion and sediment control best management practices (BMPs) to prevent off-site sedimentation in accordance with all Federal and/or state environmental regulations. Commonly utilized BMPs include, but are not limited to, rock construction entrances, sump pits, compost filter socks, silt fence, rock filters, and sediment traps.

Evaluate the existing conditions of the waste disposal unit prior to the commencement of cover system construction activities. If the given waste disposal unit has free standing water measures may be taken in order to remove standing water of consequence to future construction activities. If the waste disposal unit has an existing drainage feature dewatering may include promoting positive drainage for all low-lying areas. If no drainage feature is present at the waste disposal unit other BMPs or approved means may be utilized. Based on an evaluation of the existing waste material physical properties additional dewatering activates may take place at this point in the construction sequence. These dewatering activities should produce a suitable waste material subgrade for future construction activities.

Following the completion of dewatering activities would be the commencement of subgrade preparation for the deployment of the low-permeability component or geomembrane. Based on the existing conditions of the waste disposal unit the extent of subgrade preparation work may vary. First the waste disposal unit should be cleared and grubbed of all consequential vegetation then a level of effort may be made to ensure there are no potential puncture risks. Puncture risks include, but are not limited to, trees, rocks, debris and/or other protrusions from the subgrade surface. If the waste disposal unit closure design requires any work to be completed below the low-permeability component or geomembrane it may be completed at this time. Some construction activities this might include are the construction of the cell separation features and additional drainage features, both temporary and permanent. If there are any disturbances to the subgrade waste surface a level of effort may be made to smooth and flatten the waste surface to promote good contact between the waste surface and the low-permeability component or geomembrane. This smoothing action may be accomplished with the use of drag mats, rollers, or other similar implements.

Once the subgrade has been prepared to meet the design parameters the chosen low-permeability component or geomembrane (4) will be deployed. Based on the site specific conditions of the waste disposal unit and the material selection of the low-permeability component or geomembrane the installation practices may vary. In general the deployment of the low-permeability component or geomembrane (4) should be to the manufacture recommendations. The low-permeability component or geomembrane may be deployed in multiple panels, rolls, or other geometries. Depending on the specific waste disposal units characteristics the low-permeability component or geomembrane may also be deployed as a single piece. If the low-permeability component or geomembrane is deployed in multiple sections the low-permeability component or geomembrane will need to be joined together. Often joining is accomplished by overlapping and seaming the individual low-permeability component or geomembrane sections. The method in which the low-permeability component or geomembrane is seamed will be dependent of the material selection and other site-specific considerations. Some potential joining methods, which may be used, are glue, tape, fusion weld or extrusion weld. All subsequent construction sequences should ensure that the low-permeability component or geomembrane is not damaged.

Following the completion of the low-permeability component or geomembrane installation a protective cover layer material (3) should be placed over the low-permeability component or geomembrane (4). The placement method of the protective cover layer material will be dependent on the material selection. The material selection process will take into account the site-specific conditions, the design of the waste disposal closure system, and other variables. Protective cover layer material may be placed mechanically, via sluicing hydraulically (ie. wet), or other means.

After the protective cover layer material has been placed grading of the material may take place to ensure the as-built final grades represent the design grades for the waste disposal unit.

If the design of the waste disposal unit closure calls for the planting of vegetation within or on top of the protective cover layer to achieve the desired generation of habitat it should take place after the protective cover layer material is to final grades.

Example II

At a possible CCR waste material pond, the pond will likely have existing access around the perimeter of the impoundment in the form of existing dams and access roads. For closure the current invention will utilize the existing waste material to grade separation components (under the low-permeability component or geomembrane) to form multiple cells. Each cell will have a spillway to control the water elevation and the cells are hydraulic connected to a common drainage feature. The waste material will be groomed, EPDM liner will be installed on top of the waste material, protective cover layer material greater than 6 inches will be placed on top of the EPDM. The construction will be done with specialized equipment so that additional access roads will not have to be built. The protective cover layer material will be suitable for vegetation to grow. Islands will be made from the protective cover layer material to promote habitat. Slopes of the sustainable habitat cells will utilize existing grades where possible and the separation components will be <5%.

Example III

Equivalency demonstration of infiltration between a 2-foot thick clay covers system with a permeability of $1\times10^{-6}$ (cm/s) and an embodiment disclosed waste disposal closure system is shown in the chart below. The demonstration was conducted using the Hydrologic Evaluation of Landfill Performance. Each system was modeled for a representative one (1) acre area based on five (5) years of simulated synthetic precipitation data generated from the site-specific Columbus, Ohio gage station based on historical data. Based on the HELP model results, a cover system designed in accordance with the Ohio EPA Requirements allows for an annual percolation of 7.27 inches with 80.3 percent cap efficiency whereas the embodiment data used for the chart waste disposal closure system allows for an annual percolation of 5.05 inches with 86.2 percent cap efficiency. The embodiment data used for the chart results in a 30.5% reduction in the percolation over the clay cover system.

$$\text{Cap Efficiency} = \left[1 - \left(\frac{\text{Annual Percolation}}{\text{Average Yearly Precipitation}}\right)\right] * 100\%$$

We claim:

1. An impoundment closure system comprising:
   a. a waste impoundment site comprising waste material wherein a plurality of separation components are formed from said waste material protruding above an aqueous layer to form a plurality of cells;
   b. a low-permeability component on the top of said waste material and said plurality of separation components, the low-permeability component having a permeability not greater than $1\times10^{-6}$ (cm/s);
   c. a protective cover layer on top of said low-permeability component; and
   d. said aqueous layer on top of said protective cover layer and within said plurality of cells.

2. The impoundment closure system of claim 1, wherein said waste material is coal combustion residuals.

3. The impoundment closure system of claim 1, wherein said low-permeability component has multiple ends within each of said plurality cells and is permanently attached at said ends to said separation components.

4. The impoundment closure system of claim 1, wherein said waste impoundment site has less than 1% slope.

5. The impoundment closure system of claim 1, wherein said protective cover layer is soil, dirt, fill, rocks, clay or a combination thereof.

6. The impoundment closure system claim 1, wherein there is at least a 30.5% reduction in percolation through the low permeability component as compared to a clay cover system wherein the clay cover system is 2 feet thick with a permeability of $1\times10^{-6}$ (cm/s) using the Hydrologic Evaluation of Landfill Performance Model for a one-acre area based on five years of simulated synthetic precipitation data generated from a site specific Columbus, Ohio gage station based on historical data.

7. The impoundment closure system of claim 6, wherein said low-permeability component allows for no more than 5.05 inches of annual percolation.

8. The impoundment closure system of claim 1, wherein the low-permeability component has at least 86.2% cap efficiency.

9. The impoundment closure system of claim 1, wherein said a low-permeability component is anchored into said waste material.

10. The impoundment closure system of claim 1, wherein said waste material has a slope of less than 1%.

11. The impoundment closure system of claim 1, wherein said cells are in fluid communication with one another.

12. The impoundment closure system of claim 1, wherein there is a sensor in or on top of said waste material.

13. The impoundment closure system of claim 1, wherein said low-permeability component is a geomembrane.

14. The impoundment closure system of claim 13, wherein said geomembrane is made from high density polyethylene, low density polyethylene, polyvinyl chloride, or ethylene propylene diene monomer.

15. The impoundment closure system of claim 13, wherein said geomembrane comprises multiple panels connected together.

16. The impoundment closure system of claim 1, further comprising aquatic plants planted within more than one of said cells.

17. The impoundment closure system of claim 1, wherein islands are present within more than one cell.

18. The impoundment closure system of claim 1, wherein said protective cover layer is at least 6 inches thick.

19. The waste disposal closures system of claim 1, wherein said protective cover layer is suitable for plant growth.

20. The waste disposal closure system of claim 1, wherein said protective cover layer covers more than 50% of said low-permeability component.

21. The impoundment closure system of claim 1, wherein the low-permeability component is placed directly over the surfaces of said waste material and said plurality of separation components.

22. A waste disposal closure system comprising:
  a. a waste disposal site containing waste material wherein said waste material defines at least one separation component protruding above an aqueous layer;
  said separation component having less than 5% slope as a final grade overall;
  b. a low-permeability component on top of said waste material and said at least one separation component, and permanently attached at said ends to perimeter of said waste disposal site wherein said low-permeability component comprises multiple panels connected together; the low-permeability component having a permeability not greater than $1 \times 10^{-6}$ (cm/s);
  c. a protective cover layer on top of said low permeability component wherein said protective cover layer is at least 6 inches deep;
  d. said aqueous layer on top of said protective cover layer; and
  e. a drainage duct for water to exit said waste disposal site.

* * * * *